United States Patent [19]

Stockdale et al.

[11] Patent Number: 5,088,860

[45] Date of Patent: Feb. 18, 1992

[54] PROCESS AND APPARATUS FOR SELECTIVELY GATHERING LIGHTWEIGHT LOW DENSITY OBJECTS

[75] Inventors: Clyde E. Stockdale, Canton; Steven E. Archer, New Philadelphia, both of Ohio

[73] Assignee: Poly-Vac Co., Canton, Ohio

[21] Appl. No.: 666,727

[22] Filed: Mar. 8, 1991

[51] Int. Cl.$^5$ ............................................. B65G 53/14
[52] U.S. Cl. ...................................... 406/153; 406/39; 406/171
[58] Field of Search .................. 406/38, 39, 113, 151, 406/153, 171

[56] References Cited

U.S. PATENT DOCUMENTS

| | | | |
|---|---|---|---|
| 767,611 | 8/1904 | Turk | 406/39 |
| 891,191 | 6/1908 | Shinn et al. | 406/39 |
| 1,047,164 | 12/1912 | Butenschoen | 406/38 |
| 1,559,804 | 11/1925 | Sweeny | 55/315 |
| 2,673,125 | 3/1954 | Squire, Jr. | 406/137 |
| 2,955,880 | 10/1960 | Schlicksupp | 406/153 |
| 3,152,839 | 10/1964 | Edwards | 406/193 |
| 3,175,515 | 3/1965 | Cheely | 417/197 |
| 3,276,821 | 10/1966 | Edwards | 406/193 |
| 4,028,009 | 6/1977 | Gudzenko et al. | 166/51 |
| 4,411,388 | 10/1983 | Muck | 239/419.5 |

Primary Examiner—Johnny D. Cherry
Assistant Examiner—Andrew C. Pike
Attorney, Agent, or Firm—Paul E. Milliken

[57] ABSTRACT

A vacuum system is provided for selectively removing lightweight low density objects such as loose polystyrene packing material referred to as "peanuts" or "popcorn" from shipping cartons using a very low pressure vacuum which withdraws only the packing material and leaves the packed items in the carton. A low pressure vacuum is created in an elongated cylindrical conduit by directing air pressure from an annular plenum chamber into streams of air flowing through a series of spaced apart holes in a wall of the conduit toward the downstream end of the condudit. The conduit has an intake hose connected to its upstream end and a collection container at its downstream end. The packing material is drawn into the intake hose and through the conduit to the collection container.

15 Claims, 3 Drawing Sheets

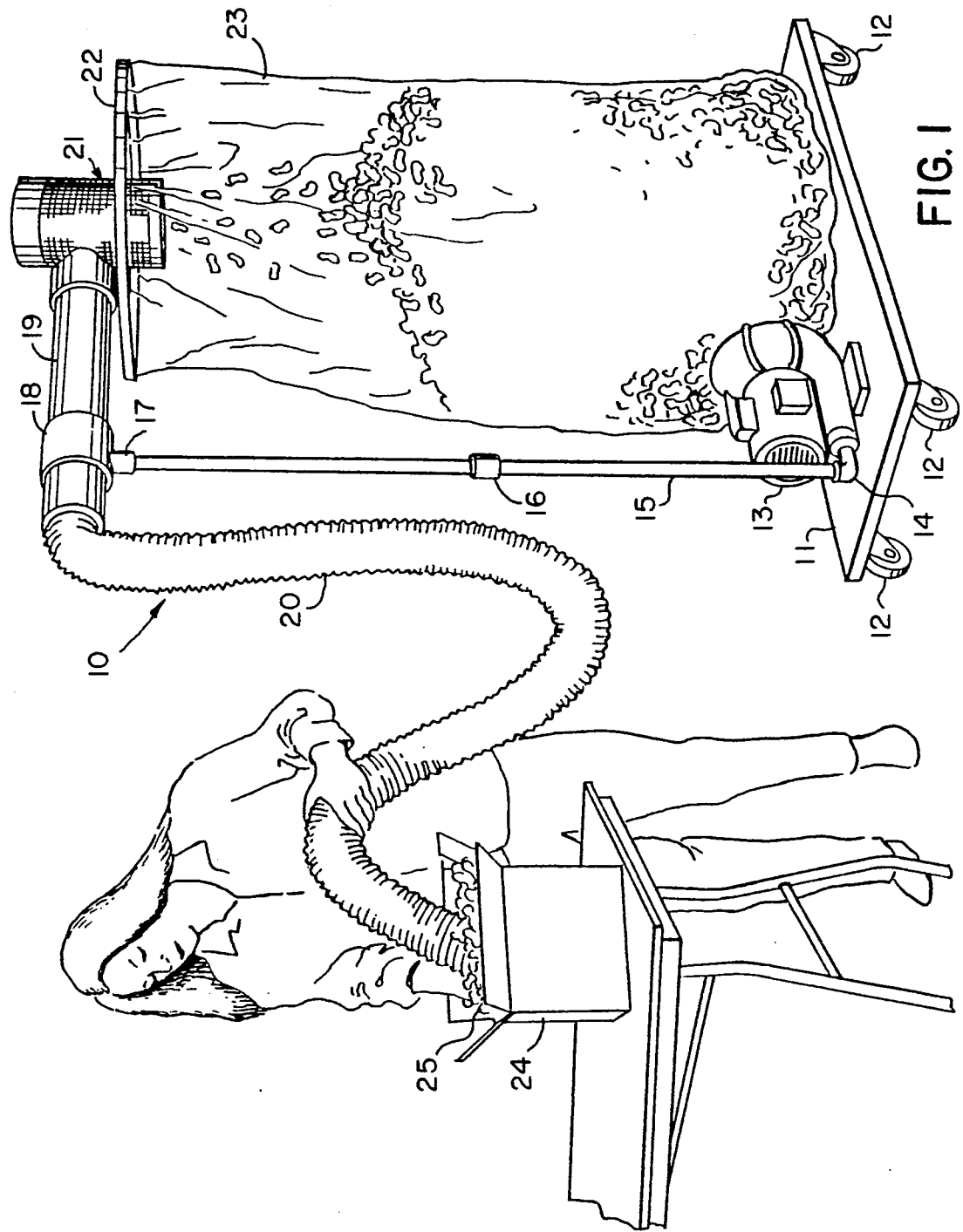

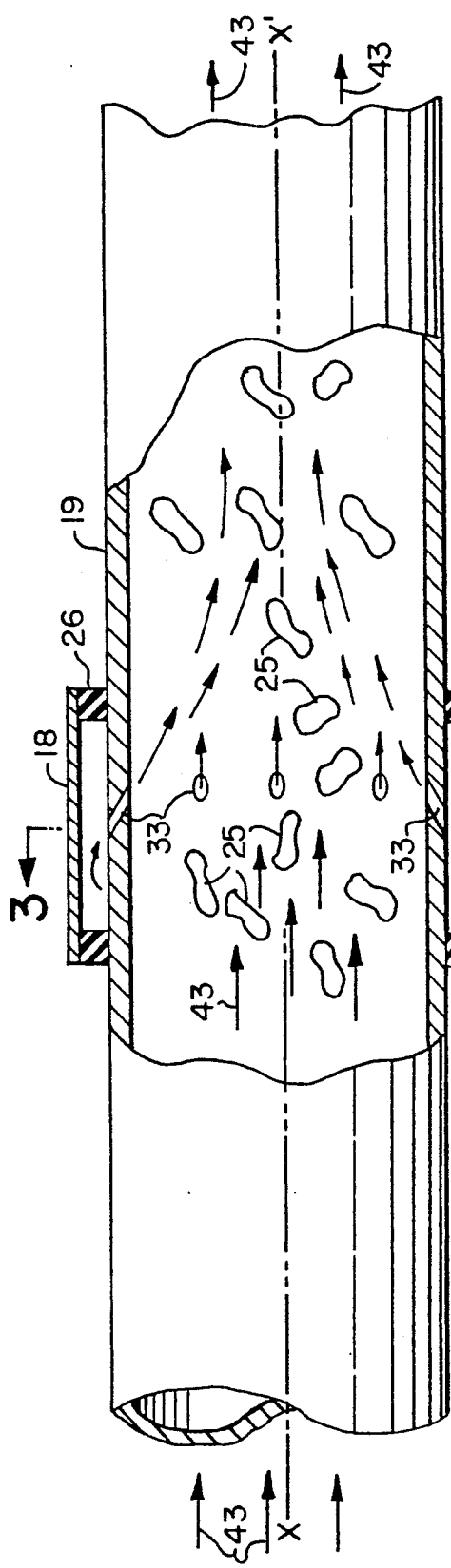
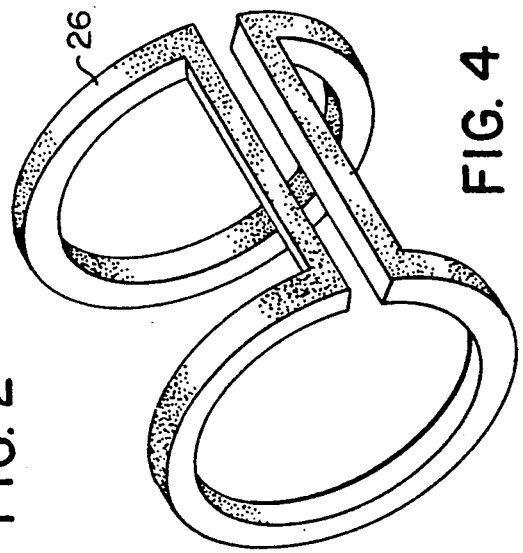
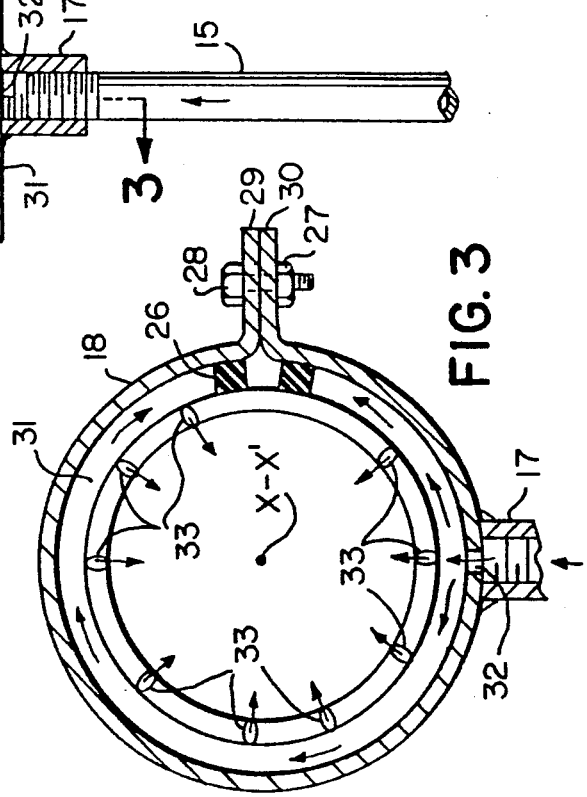

PROCESS AND APPARATUS FOR SELECTIVELY GATHERING LIGHTWEIGHT LOW DENSITY OBJECTS

This invention relates to a process and apparatus for selectively gathering lightweight low density objects such as loose polystyrene packing material referred to as "peanuts/popcorn" from shipping cartons using a very low pressure vacuum which withdraws only the packing material and leaves the packed items in the carton.

BACKGROUND OF THE INVENTION

In the past, when shipping cartons are opened and loose packing material such as polystyrene "peanuts or popcorn" are used around the objects shipped in the carton, the loose packing material has been removed by hand and tends fall onto worktables or the floor and must be swept up after the cartons are unpacked.

In many companies this packing material is then thrown out with the trash from the receiving department while their shipping department orders new packing material to put in outgoing cartons.

While it would be desirable both from the economic and environmental standpoint to collect the packing from incoming cartons and reuse such packing in outgoing cartons, there has not been any rapid and efficient means of accomplishing this task.

Until the present time the use of vacuums have been impractical since the available vacuums have either had too much suction and would pick up both the packing and the contents of the cartons or the vacuums were not suitable for handling large low density lightweight objects which, due to their bulk, fill the collection bags quite rapidly and may clog some of the intake hoses.

A typical example of a prior art vacuum cleaning apparatus is shown by U.S. Pat. No. 1,559,804 issued to R. P. Sweeny which shows a vacuum cleaner for lint, dust, and light trash in a textile factory. This device has a large trash collection bag and the airflow in the suction tube is induced by a single stream of compressed air injected at an angle into the suction tube. This vacuum device, however, is not capable of selectively picking up particles of certain density but picks up all loose particles in the path of the intake nozzle.

Another prior art device is shown in U.S. Pat. No. 4,411,388 issued to J. E. Muck. This device, however, is not designed for collecting material particles but for distributing loose insulation drawn from a storage container. It is not designed to selectively gather particles of certain density to separate them from higher density article.

OBJECTS OF THE INVENTION

It is a primary object of the invention to provide a simple and inexpensive process and apparatus for selectively gathering lightweight low density objects such as loose polystyrene packing material from a mixture of objects of various weights and densities.

Another object of this invention is to provide an apparatus for selectively removing lightweight packing material from a shipping carton without removing the articles of merchandise which were shipped in the carton.

Still another object of the invention is to provide an apparatus for removing loose lightweight low density packing material from an incoming shipping carton and temporarily depositing the packing material in a storage container for later use in an outgoing shipping container.

These and other objects of the invention will become more fully apparent in the following specification and the attached drawings.

SUMMARY OF THE INVENTION

This invention is a low pressure vacuum system for selectively removing lightweight low density objects such as polystyrene packing material from shipping cartons without removing the packed items from the carton. The packing material is drawn from the carton by a low pressure vacuum through a hose and a conduit into a collection container for reuse. The low pressure vacuum is created by angular streams of air directed through the conduit wall into the conduit, causing a directional airflow through the conduit. Prior art vacuums will not selectively pick up only items of certain ranges of weights and densities but will pick up all items regardless of the density.

DESCRIPTION OF THE DRAWINGS

FIG. 1 is a perspective view of the entire apparatus of the invention being used to remove packing material from a shipping carton;

FIG. 2 is a fragmentary side elevational view of a portion of the vacuum inducing conduit of the invention with portions broken away to show the details of the surrounding plenum chamber;

FIG. 3 is a sectional view of the vacuum inducing conduit and plenum chamber taken on line 3—3 of FIG. 2;

FIG. 4 is an isometric view of the gasket which forms a seal between the vacuum conduit and the outer circumferential wall of the plenum chamber and the vacuum inducing conduit;

DESCRIPTION OF THE PREFERRED EMBODIMENTS

Figure 5:
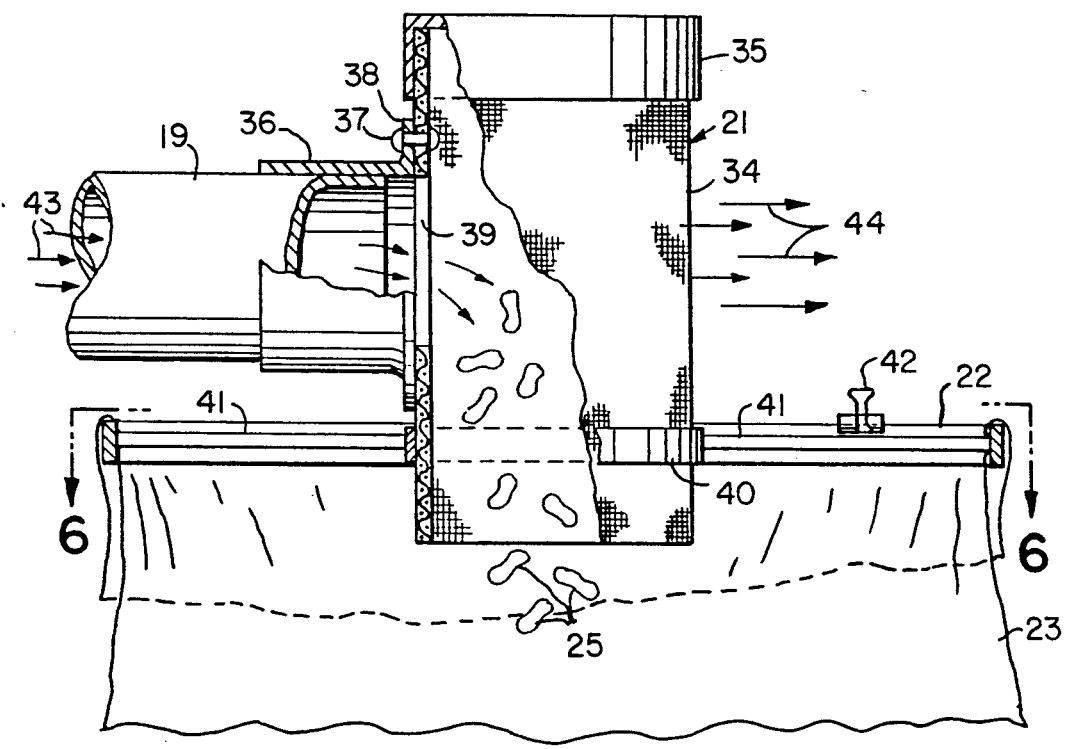
FIG. 5 is a fragmentary side elevation view showing the outlet end of the vacuum inducing conduit with an outlet deflector cage mounted thereon and a hoop for retaining a collection container which receives objects exiting from the outlet end of the vacuum inducing conduit.

Referring now to the drawings and in particular to FIG. 1, the vacuum apparatus for carrying out the present invention is designated generally by the numeral 10. The vacuum 10 is mounted on a rectangular base 11 having a plurality of casters 12 for mobility of the apparatus.

A blower 13 is mounted on the top surface of the base 11 near one end thereof. The blower 13 may be a standard electric powered regenerative blower of the type produced by Gast Manufacturing Corporation of Benton Harbor, Mich. or any other similar standard blower. The blower 13 may be any blower having an output pressure capacity of from 25" to 43" (63.5 cm to 109.2 cm) in $H_2O$. The blower 13 has an outlet 14 from which extends a vertical rigid air pressure pipe 15. The pipe 15 may be in multiple sections joined together by a coupling 16. The upper end of the pipe is threaded and screws into a threaded fitting 17 which is attached to a split cylindrical collar 18.

The collar 18 surrounds a rigid horizontal conduit 19 of substantially uniform cross section throughout its length and forms a plenum chamber therebetween as will be described later. The pipe 15 serves both as a vertical support member for the conduit 19 and as a means of connecting the outlet 14 of the blower 13 or air pressure source to the plenum chamber 31. A flexible intake hose 20 is attached to the inlet end of the conduit 19. Attached to the opposite or outlet end of the conduit 19 is an outlet deflector cage assembly 21 which will be described in more detail later. The assembly 21 supports a ring or hoop 22 in a horizontal plane with the hoop surrounding the lower portion of the assembly 21. A collection and storage bag 23 of plastic film or other suitable material is attached to the hoop 22 in a manner to be described later. When the blower 13 is turned on, air pressure passing through the pipe 15 and into the duct 19 causes a directional flow of air in the conduit 19 and creates a low pressure vacuum at the inlet end of the intake hose 20 in the range of 0.4" to 0.65" (1.016 cm to 1.651 cm) in $H_2O$. When the intake end of the hose 20 is inserted into a carton 24, the low pressure vacuum in the hose 20 draws the loose particles of polystyrene packing material 25 through the hose 20 and the conduit 19 where it exits from the outlet end and is deflected by the deflector cage 21 to drop into the collection bag 23.

Referring now to FIGS. 2 and 3 where similar parts will be given similar numerals to those in FIG. 1, the air pressure pipe 15 is shown screwed into the threaded fitting 17 which is attached by welding or other suitable means to the split cylindrical collar 18 which surrounds the vacuum inducing conduit 19.

A resilient gasket 26 such as that shown in FIG. 4 of elastomeric or other suitable material is positioned around the conduit 19 and the split collar 18 is clamped around the gasket 26 by tightening nuts 27 on bolts 28 which extend through flanges 29 and 30 on the collar 18.

Tightening the collar 18 around the gasket 26 creates a plenum chamber 31 which is sealed except for an air inlet opening 32 through the wall of the collar 18 located adjacent to the upper end of the air pressure pipe 15 and a plurality of circumferentially spaced inlet holes 33 extending through the wall of the conduit 19 from inside the plenum chamber 31.

In one of the preferred configurations of the invention the conduit 19 is made from a 4" (10.16 cm) I.D. pipe having a wall thickness of ¼" (0.635 cm). The holes 33 are 3/16" (0.476 cm) in diameter and are inclined at a 30° angle with respect to the longitudinal axis X—X' of the conduit 19. With this hole configuration and size it has been found that 8 holes spaced apart around the circumference of the conduit 19 provide the correct amount of air flowing from the plenum chamber 31 into the interior of the conduit 19 to generate the correct amount of vacuum pressure at the inlet end of the intake hose 20 to withdraw only the packing material 25 from a carton 24 as shown in FIG. 1.

The amount of vacuum at the inlet end of the intake hose 20 is a function of the amount of pressure in the pipe 15, the size, number, and angle of the holes 33 in relation to the diameter and wall thickness of the conduit 19. The diameter of the holes 33 could be in the range of from 0.125" to 0.1875" (0.318 cm to 0.4765 cm) and the angle of inclination could be in the range of 10° to 30°.

It should be noted that no holes are located in the wall of the conduit 19 adjacent to the clamping flanges 28 and 29 since, due to the configuration of the gasket 26, this portion of the wall is not part of the plenum chamber 31 which is enclosed by the gasket 26.

Figure 6:
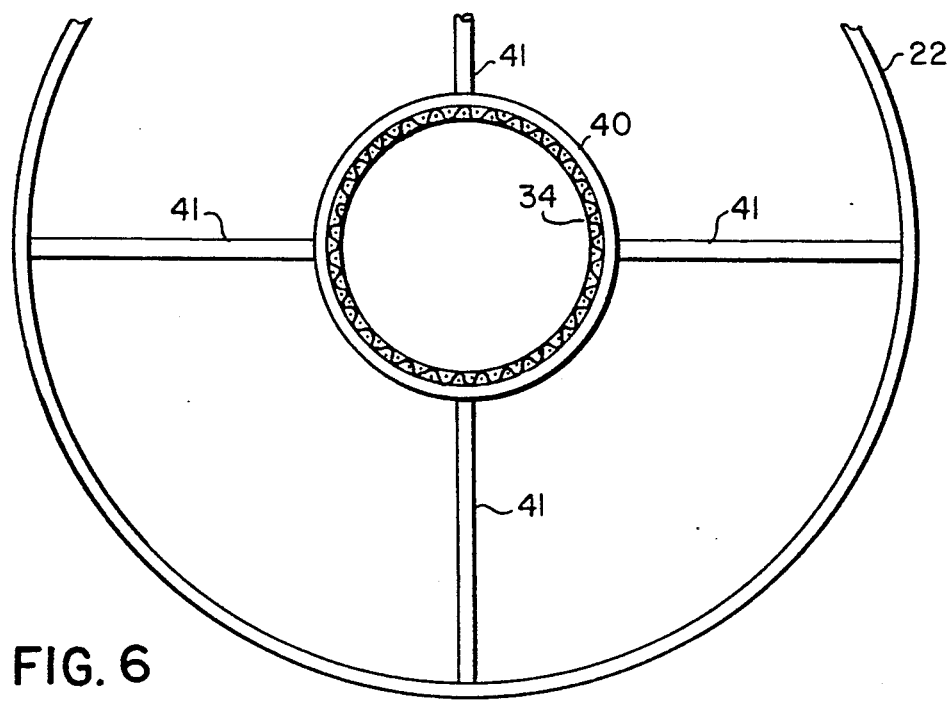
FIG. 6 is a fragmentary sectional view taken on line 6—6 of FIG. 5 and showing the hoop for retaining a collection container and the manner in which the hoop is attached to the outlet deflector cage.

Referring now to FIGS. 5 and 6, the conduit 19 has the outlet deflector cage assembly 21 mounted thereon as previously shown in FIG. 1. The assembly 21 includes a cylindrical screen 34 with a top cap member 35 covering the upper end thereof and a flanged collar member 36 attached to the side of the screen 34 with rivets 37 extending through the flange 38 and through the screen 34. The collar member 36 could also be attached by brazing or other suitable means. The screen 34 is provided with an opening 39 adjacent to where the conduit 19 is attached to the screen 34 to permit material flowing through the conduit 19 to flow into the interior of the cylindrical screen 34 and then to drop down into the collection container bag 23.

A rigid circular support band 40 is mounted surrounding the outside surface of the screen 34 at a location spaced at a selected distance above the bottom edge of the screen 34.

A plurality of elongated bars or spoke members 41 each have one end thereof attached to the support band 40 and extend radially outwardly therefrom at spaced locations around the band 40. The radially outer ends of the members 41 are attached to the container support hoop 22, (previously shown in FIG. 1) which supports the bag or container 23.

In the usual situation the container 23 is a bag of plastic or other suitable material which is fastened to the hoop 22 by folding the top of the bag 23 over the hoop 22 and placing a number of spring clips such as the clip 42 around the top of the hoop 22 to hold the bag in position on the hoop. For simplicity the bag 23 is not shown in FIG. 6 since the configuration is shown sufficiently in FIGS. 1 and 5.

In operation, as shown in FIG. 1 the inlet end of the intake hose 20 is inserted in a carton 24 to only withdraw (polystyrene peanuts/popcorn) packing material 25 and transmit it through the conduit 19 in the direction of arrows 43 as shown in FIGS. 2 and 5 where the material 25 is deflected downwardly into the collection container 23 by the outlet deflector cage 21.

When the container 23 is filled to the bottom of the screen 34 the material will back up into the screen 34 and stop the flow of the material 25 from the conduit 19 while permitting the airflow through the conduit 19 to be vented through the screen 34 in the direction of the arrows 44. When the full container 23 is replaced by an empty container 23 and the blower 13 is turned on, the flow of material from the conduit 19 will resume.

It is emphasized that the important aspect of this invention is that it permits selective withdrawal of only lightweight low density packing material from cartons while leaving the items which were packed in the cartons. It is therefor important that the vacuum pressure at the inlet end of the intake hose be within the proper range to accomplish this objective. While the embodiments shown herein are examples of a process and apparatus for carrying out the objective of this invention various other embodiments may be used without departing from the scope of this invention.

We claim:

1. A process for selectively gathering loose lightweight low density objects of certain selected weights and densities from a mixture including other objects of greater densities comprising:

(A) providing an elongated cylindrical conduit having a cylindrical wall, a longitudinal axis, and an upstream end and a downstream end;

(B) providing an air pressure source;

(C) directing streams of air at a selected air pressure from the pressure source through a plurality of peripherally spaced apart air inlet holes extending through the wall of the conduit at an acute angle of inclination with respect to the axis of the conduit and inclined inwardly toward the downstream end of the conduit to cause a directional low pressure air flow through the conduit from the upstream end to the downstream end thereof;

(d) connecting a flexible intake hose to the upstream end of the conduit to receive the lightweight objects to be gathered; and (E) providing a collection container at the downstream end of the conduit to receive the lightweight objects flowing from the conduit;

(F) the selected air pressure directed through the air inlet holes being a sufficient amount to generate sufficient pressure of the directional low pressure air flow within the conduit and the intake hose to cause the loose lightweight objects of certain selected weights and densities to be drawn into the intake hose and flow through the conduit into the collection container without drawing the other objects of greater densities into the intake hose.

2. The process as claimed in claim 1 wherein the air pressure of the air at the inlet end of the intake hose is in a range of 0.40" to 0.65" (1.016 cm to 1.651 cm) in water.

3. The process as claimed in claim 1 further including the step of providing a means to exhaust the air flow from the conduit away from the collection container while directing the objects flowing through the conduit into the collection container.

4. The process as claimed in claim 1 wherein the angle of inclination of the holes through the wall of the conduit with respect to the longitudial axis of the conduit is in a range of between 10° and 30°.

5. The process as claimed in claim 1 wherein the holes through the wall of the conduit are of a diameter in a range of 0.125" to 0.1875" (0.318 cm to 0.476 cm).

6. An apparatus for selectively gathering lightweight low density objects comprising:

(A) a conduit of substantially uniform cross section having a cylindrical wall surrounding a longitudinal axis and defining a hollow interior, the wall having a plurality of holes therethrough, said holes being spaced circumferentially from each other around at least part of the cylindrical wall;

(B) plenum chamber means at least partly surrounding the cylindrical wall in such a location as to be in communication with the holes therethrough;

(C) an air pressure source (D) means connecting the air pressure source to the plenum chamber means to permit air pressure to flow from the air pressure source to the plenum chamber means, creating air pressure therein which in turn flows through the holes in the conduit into the interior thereof thereby causing an induced directional airflow through the conduit from an intake end to an outlet end thereof; and (E) a flexible elongated intake member having one end connected to the intake end of the conduit and another end inserted into a group of the lightweight objects to be gathered, when the apparatus is in use, to draw the lightweight objects into the input end of the conduit and eject them from the outlet end thereof into a collection container.

7. The apparatus as claimed in claim 6 wherein the plenum chamber means comprises a substantially cylindrical ring member at least substantially surrounding the conduit, said ring member having a hole therethough to provide communication between the plenum chamber means and the means connecting the air pressure source thereto, and further includes a resilient seal member positioned in sealing engagement between the ring member and the conduit, thereby creating a sealed chamber to contain the air pressure received from the air pressure source except for the air flowing through the holes in the conduit wall into the interior of the conduit.

8. The apparatus as claimed in claim 6 wherein the air pressure of the air at the inlet end of the intake hose is in a range of 0.40" to 0.65" (1.016 cm to 1.651 cm) in $H_2O$.

9. The apparatus as claimed in claim 6 wherein the holes through the wall of the conduit are inclined at an angle in a range of 10° to 30° with respect to the longitudinal axis of the conduit.

10. The apparatus as claimed in claim 6 wherein the holes through the wall of the conduit are of a diameter in a range of 0.125" to 0.1875" (0.318 cm to 0.476 cm).

11. The apparatus as claimed in claim 6 wherein the conduit is supported in a horizontal position by a substantially vertical support member.

12. The apparatus as claimed in claim 11 wherein the vertical support member is also the means connecting the air pressure source to the plenum chamber means.

13. The apparatus as claimed in claim 6, further including a means to exhaust the airflow from the conduit away from the collection container adjacent the outlet end of the conduit while directing the objects flowing through the conduit into the collection container.

14. The apparatus as claimed in claim 13 wherein the means to exhaust the airflow from the conduit away from the collection container is a perforate screen member having an open bottom to allow the objects flowing from the outlet of the conduit to fall into the collection container placed beneath the screen member.

15. The apparatus as claimed in claim 6 wherein the entire apparatus is supported on a castered platform for easy movement from one location to another.

* * * * *